United States Patent
Jacquot et al.

[15] 3,698,619
[45] Oct. 17, 1972

[54] DEVICE FOR THE MANUFACTURE OF AN INSULATING PANE UNIT

[72] Inventors: Michel Jacquot, Beynes; Charles Amicel, Carrieres, Seine, both of France

[73] Assignee: Boussois Souchon Neuvesel, Paris, France

[22] Filed: July 6, 1970

[21] Appl. No.: 52,525

[30] Foreign Application Priority Data

July 24, 1969 France.....................6925254

[52] U.S. Cl. ...........................228/6, 29/487, 228/4, 228/44, 228/46, 228/51, 29/493
[51] Int. Cl.............................B23k 1/00, B23k 5/00
[58] Field of Search ......228/4, 6, 44, 46, 51; 219/85; 29/487, 493

[56] References Cited

UNITED STATES PATENTS

| | | | |
|---|---|---|---|
| 2,045,372 | 6/1936 | Schumacher | 219/85 |
| 2,057,037 | 10/1936 | Krorquest | 228/6 |
| 2,332,368 | 10/1943 | Burtenshaw | 228/46 X |
| 2,701,291 | 2/1955 | Cowles | 219/85 |
| 2,986,811 | 6/1961 | Rudd | 228/44 UX |
| 3,403,242 | 9/1968 | Cropp et al. | 219/85 |
| 3,543,385 | 12/1970 | Jovaux et al. | 228/51 X |
| 3,589,591 | 6/1971 | Schwenn | 228/51 X |

Primary Examiner—John F. Campbell
Assistant Examiner—Ronald J. Shore
Attorney—Young & Thompson

[57] ABSTRACT

A method for forming a soldered joint between one flange of a sectional lead strip and the edge of a glass plate which has previously been metallized with tin, especially for the manufacture of an insulating pane unit formed by two glass panes separated by an intercalary U-section strip. The flange of the sectional strip is applied against the glass pane under controlled pressure, the contacting surfaces are maintained at a sufficiently high temperature to melt the tin without impairing the crystal structure of the lead and the soldered joint is then allowed to cool while the pressure is maintained until the tin has set.

The device for carrying out the method comprises a stationary table along the edge of which is mounted a heating jaw for clamping one of the panes of the double pane unit together with the adjacent flange of the sectional strip. The jaw is provided on the one hand with a heating lip and on the other hand with a plate clamp, means being additionally provided for adjusting the relative spacing of the flange and of the plate clamp.

The method and device aforesaid are intended to increase the speed and regularity of production and to permit of automatic operation.

14 Claims, 13 Drawing Figures

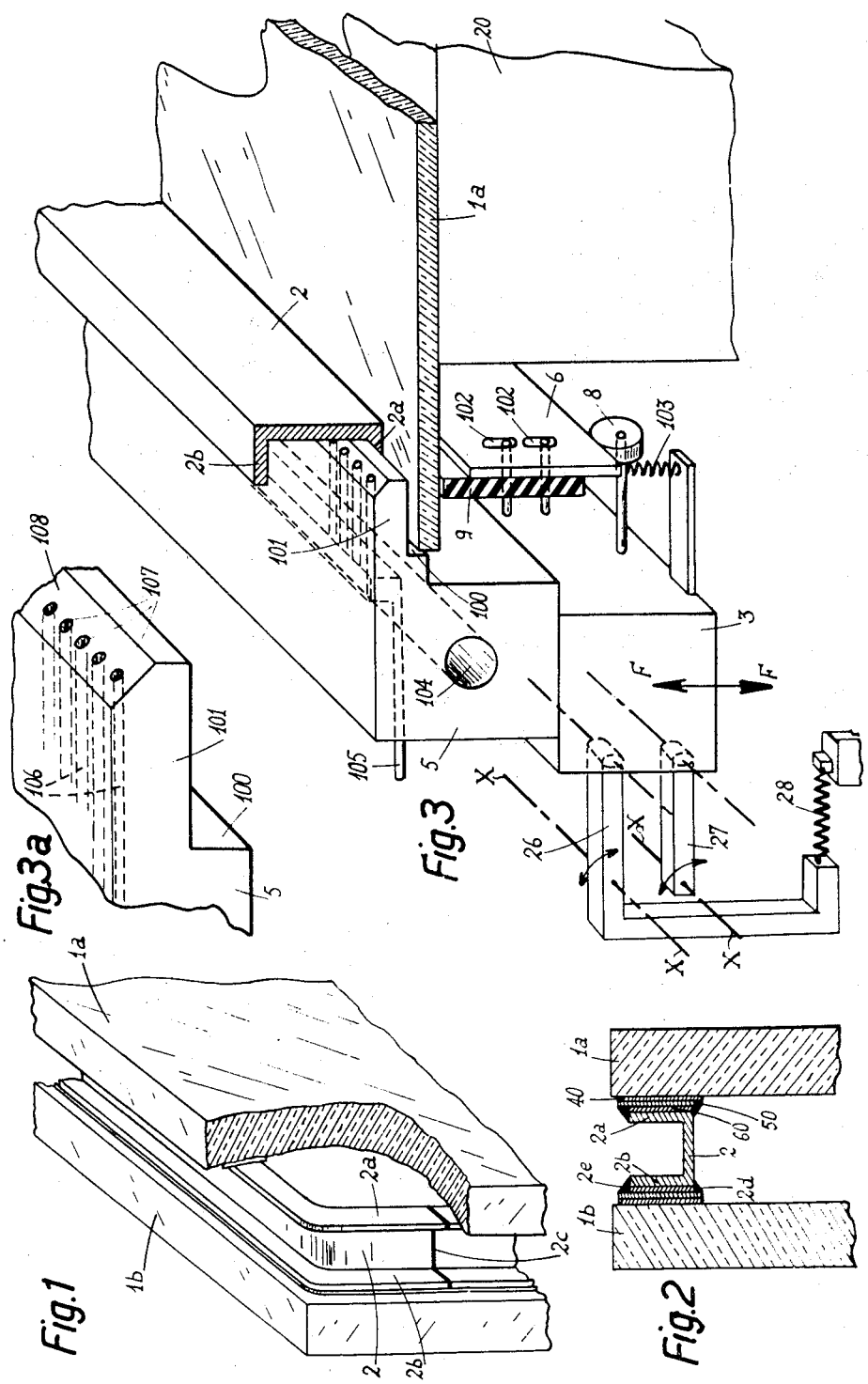

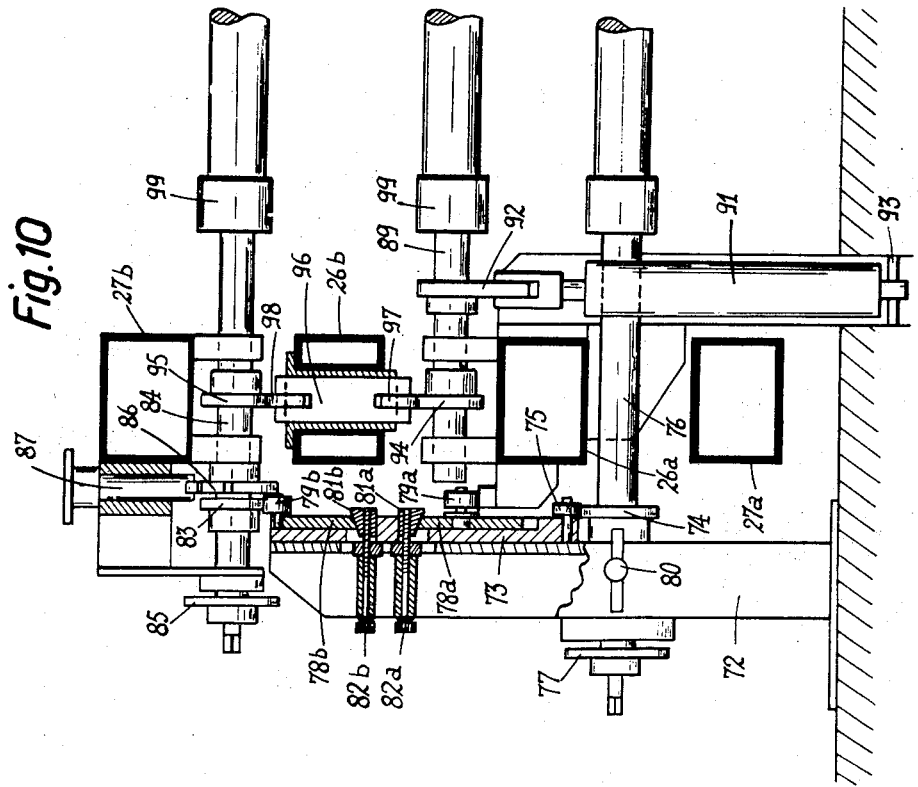
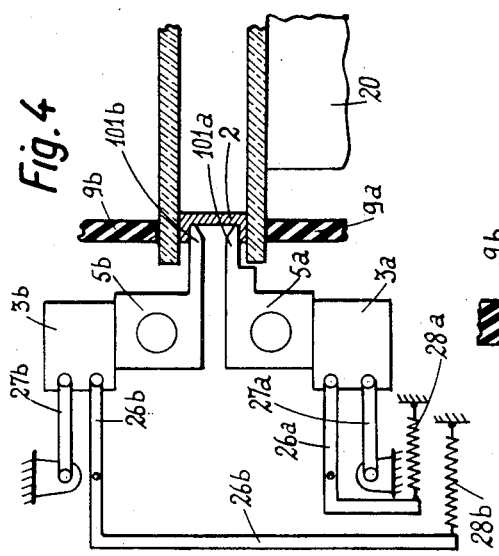
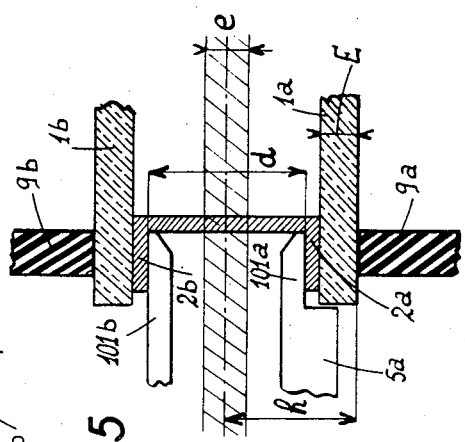

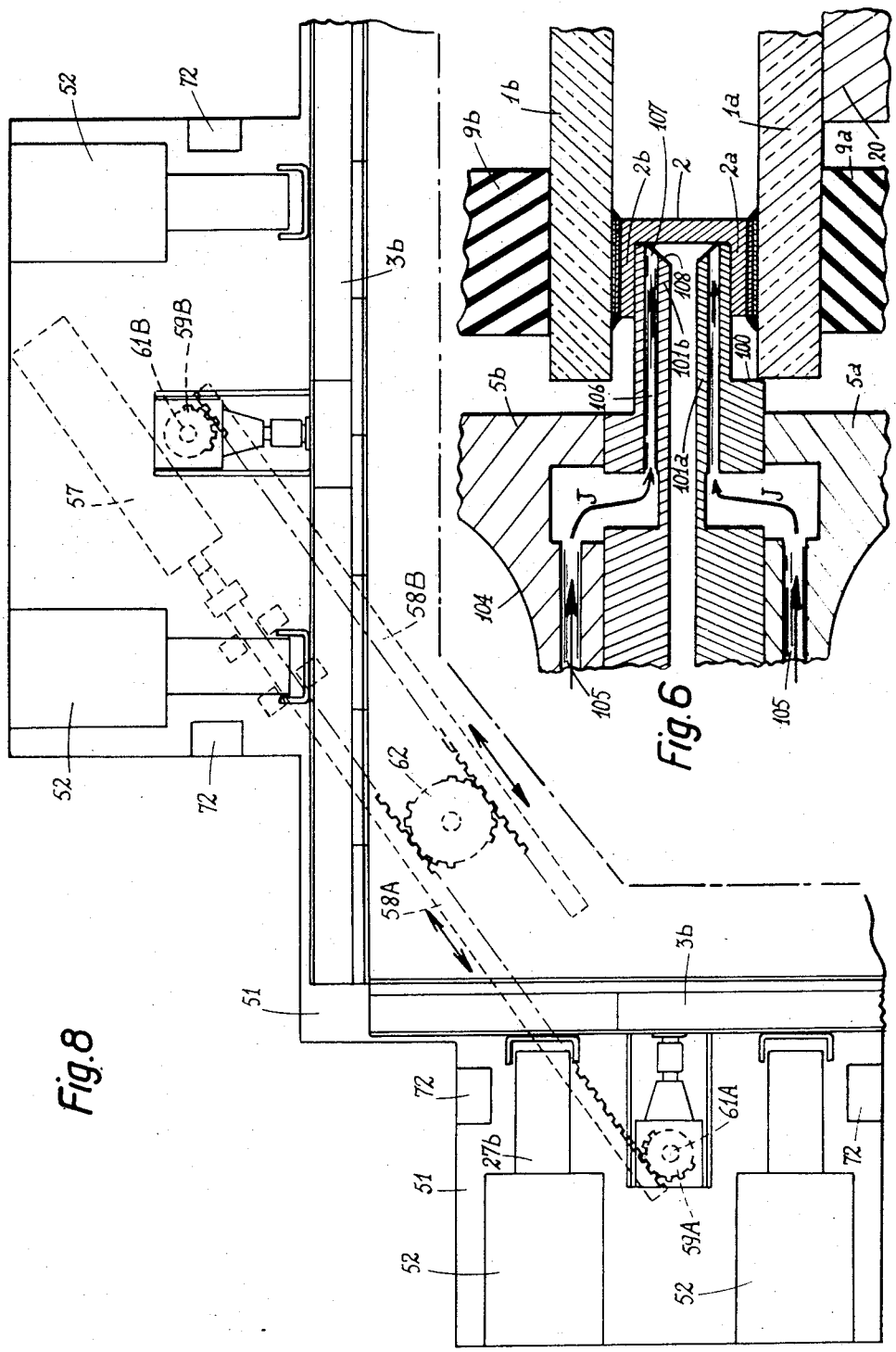

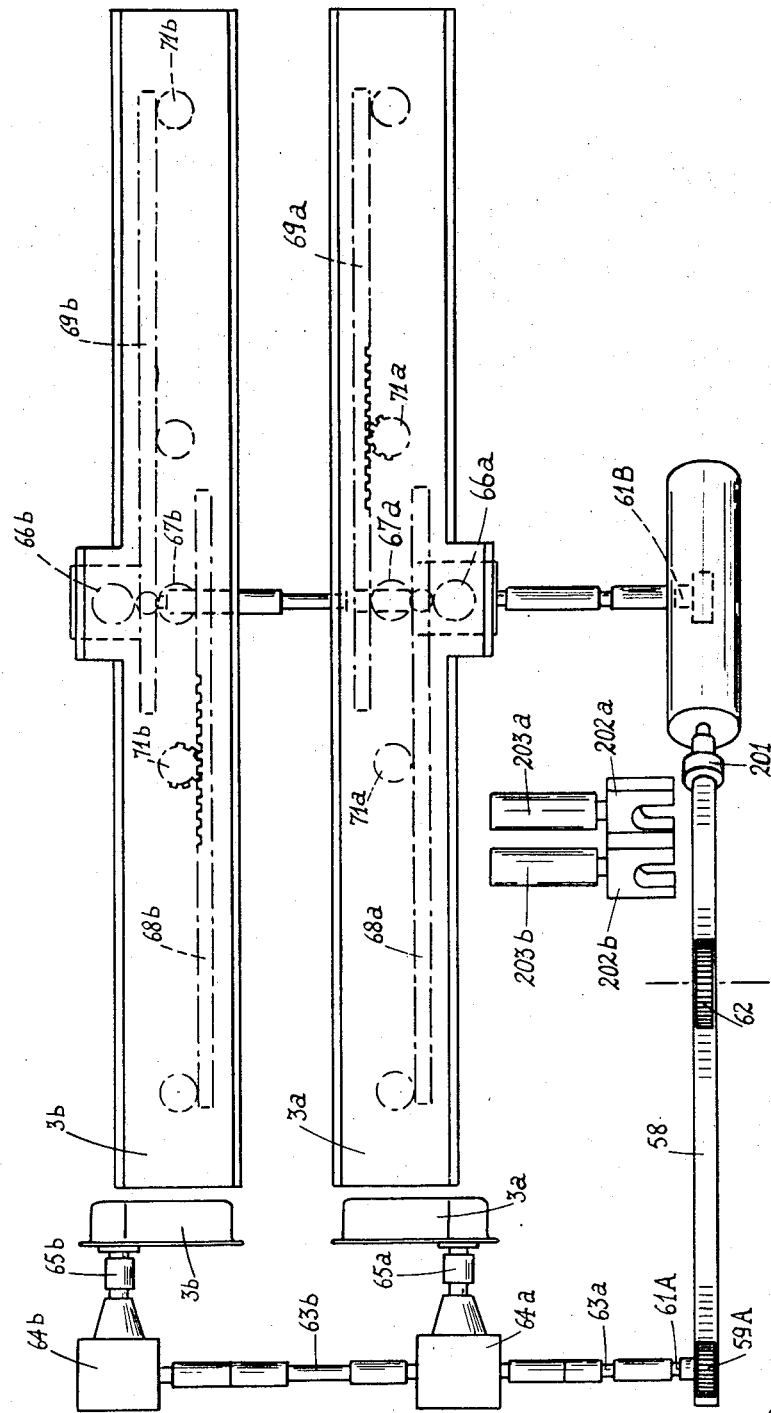

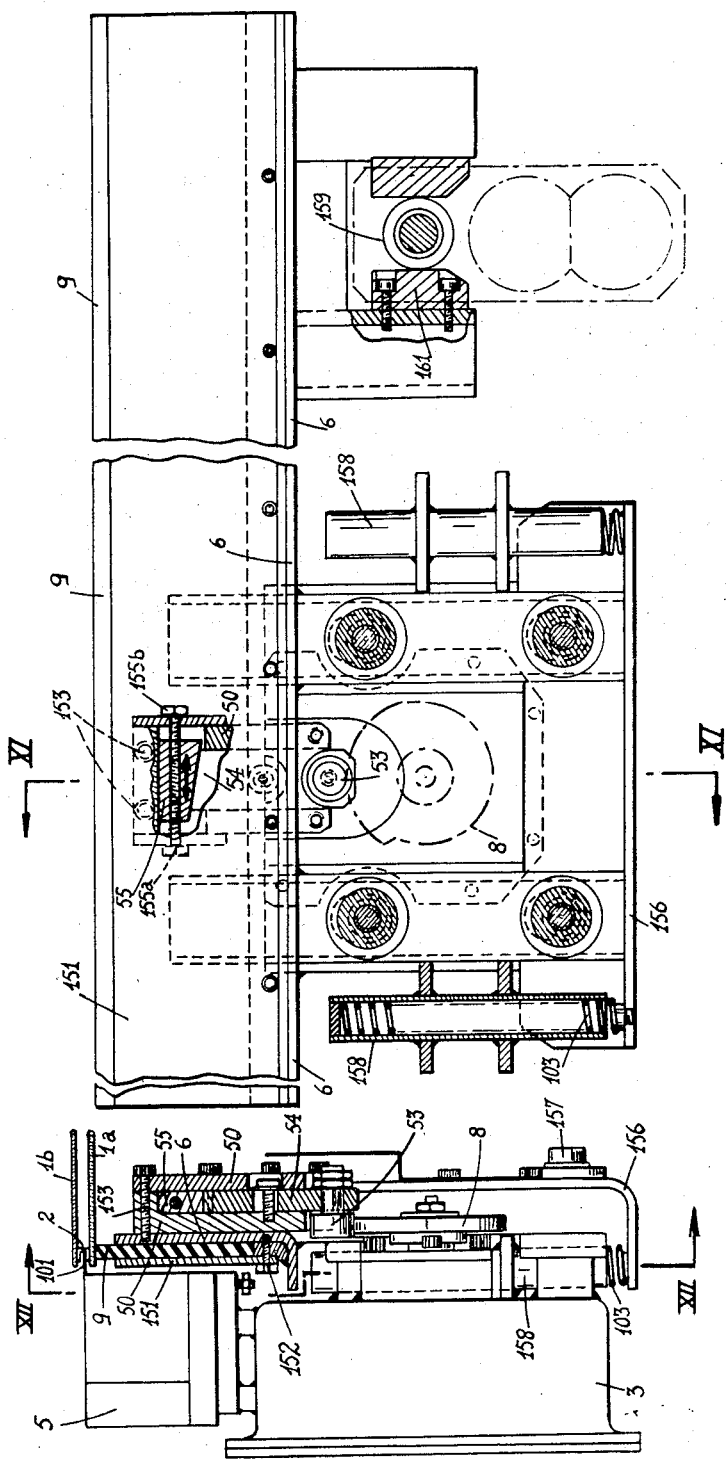

DEVICE FOR THE MANUFACTURE OF AN INSULATING PANE UNIT

This invention relates to a method and a device for the industrial manufacture of an insulating double-pane unit of known type consisting of two parallel sheets of glass which are maintained at a distance from each other by means of a welded metallic spacer member or intercalary strip, the function of said strip being to ensure mechanical strength of the assembly and leak-tightness of the internal space which is filled with dehydrated air.

Methods of assembly which are already known consist either of bonding or soldering insulating double-pane units of the type considered.

One of these methods consists in soldering a lead strip by hand using a soldering iron and a rod of filler metal, said lead strip being placed on edge between two glass panes which have been metallized and tinned beforehand.

Two disadvantages are present in this method: the cost of skilled labor and the cost of the constituent material of the filler metal rod since good mechanical strength and leak-tightness of the pane unit are dependent on the quantity of filler metal supplied.

It is also known to make use of a spacer member consisting of a U-section strip which is formed of lead and the flanges of which are soldered to the previously metallized edges of the two glass panes.

The sectional strip referred-to can be soldered at intervals particularly by an induction heating process using high-frequency current. However, this method takes a long time to perform and does not readily permit accurate control of temperature since this latter is dependent on the rate of progression of the soldering head.

Another known practice consists in forming an enclosed frame by means of the intercalary U-section strip, said frame being first soldered to one of the glass panes, whereupon the other pane is soldered to that flange of the frame which has remained free. However, a method of this type is carried out by hand and this entails a heavy cost penalty.

This invention is intended to improve a method of this type especially in order to increase the speed and regularity of production and to permit of automatic operation.

In accordance with the invention, the method for forming a soldered joint between one flange of a sectional lead strip and the edge of a glass plate which has previously been metallized with tin, especially for the manufacture of an insulating pane unit formed by two glass panes separated by an intercalary U-section strip, is characterized in that the flange of the sectional strip is applied against the glass pane under controlled pressure, that the contacting surfaces are maintained at a sufficiently high temperature to melt the tin without impairing the crystal structure of the lead, that the soldered joint is then allowed to cool and that the pressure is maintained until the tin has set.

In a preferred mode of execution of the method, the clamping pressure is maintained between 1.6 and 2.4 kg/cm$^2$ whilst the temperature of the lead is maintained between 150° and 250°C.

In one mode of execution of the invention which has given favorable results, cooling of the soldered joint is carried out by blowing a gaseous fluid onto this latter on completion of the soldering stage, the cooling action being continued until the clamping pressure is completely released.

In one embodiment of the invention which is of particular interest from an industrial standpoint, said method is applied simultaneously to both flanges of the intercalary sectional strip which serves to join the two glass panes of the insulating pane unit along the entire length of one edge of this latter. Steps are preferably taken while soldering the two opposite flanges of the intercalary sectional strip against the corresponding glass panes to prevent deformation as a result of heating of the web of the sectional strip by maintaining a constant relative spacing between the opposite flanges during the soldering operation.

The method according to the invention can be both applied simultaneously to both flanges on one side and also to two adjacent sides of the double pane unit. Under these conditions, soldering of an insulating double pane unit can be carried out in only two passes.

In accordance with the invention, the device for carrying out the method is characterized in that it comprises a stationary table along the edge of which is mounted a heating jaw for clamping one of the panes of the double pane unit together with the adjacent flange of the sectional strip, said jaw being provided on the one hand with a heating lip and on the other hand with a plate clamp, means being additionally provided for adjusting the relative spacing of the flange and of the plate clamp. The term "plate clamp" is understood to refer in this description to any device for exerting, especially along a continuous or non-continuous band, a transverse thrust on a plate or face or more specifically in the present instance on the glass pane which is to be fitted with a sealing strip.

The heating lip is preferably carried by a block containing heating elements and is in heat-conducting relationship with said block, said lip being additionally pierced by a set of ducts which serve to blow cooling air and terminate near the extremity of said lip.

In an advantageous arrangement, the heating lip and the plate clamp are mounted on a beam which extends parallel to the supporting table and is carried by articulated arms constituting deformable parallelograms in order that said beam may be subjected to a vertical movement of displacement.

In a preferred mode of assembly, the plate clamp comprises an elastic block which is capable of producing action on the glass pane by means of its edge, said block being carried by a plate which is capable of displacement in a transverse direction with respect to the heating lip and which is mounted for sliding motion along the beam.

Should it be found desirable to carry out simultaneous soldering of both flanges of the same intercalary sectional strip, the device is advantageously fitted with two superposed moving systems each comprising a heating lip and a plate clamp, said two moving systems being vertically displaceable and controlled in synchronism.

Further properties of the invention will become apparent from the following description, reference being made to the accompanying drawings which are given by way of non-limitative example, and in which:

FIG. 1 is a fragmentary diagram in perspective showing an insulating pane unit of the type which is contemplated by the invention;

FIG. 2 is a transverse sectional view of the same pane unit;

FIG. 3 is a fragmentary and simplified diagram in perspective showing a device for welding a flange;

FIG. 3a is a detail view of the heating lip of FIG. 3;

FIG. 4 is a diagrammatic transverse sectional view of the device for simultaneous soldering of both flanges of the intercalary sectional strip;

FIG. 5 is a view on a larger scale showing the two flanges during the soldering operation;

FIG. 6 is an enlarged sectional view which is similar to FIG. 5;

FIG. 8 is a corresponding plan view;

FIG. 9 is a diagrammatic view of the centralized clamping-control system;

FIG. 10 is a sectional view in elevation showing the device for controlling the stops;

FIG. 11 is a transverse sectional view taken along line XI—XI of FIG. 12 and showing an industrial embodiment of the soldering device for one face of the glass pane;

FIG. 12 is a sectional view in front elevation corresponding to FIG. 11 and taken along line XII—XII of this latter.

Figure 7:
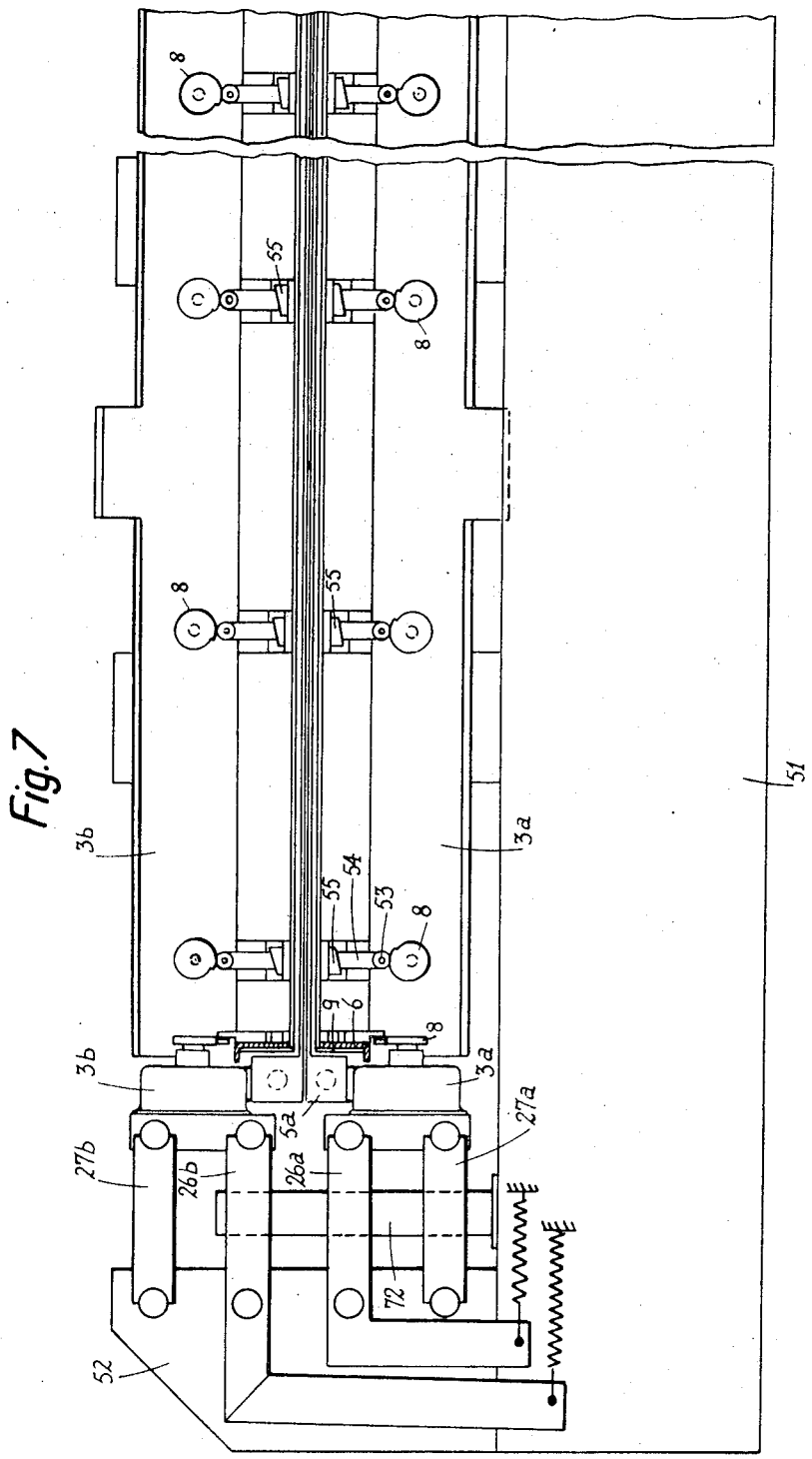
FIG. 7 is a view in elevation showing a device for soldering the lower and upper flanges along two adjacent edges of the sectional strip.

Referring to FIGS. 1 and 2 of the accompanying drawings, there is shown an insulating pane unit which is intended to be manufactured in accordance with the invention. Said unit is made up of two flat glass panes 1a, 1b which are either of square or rectangular shape and consist of plate glass, for example. Said panes are maintained in spaced relation by means of a metallic intercalary strip 2 having a U-shaped cross-section, the design function of said strip being to endow the complete unit with mechanical strength and to ensure leak-tightness of the internal space which is filled with dehydrated air.

In accordance with a known technique, the opposite edges of the glass panes 1a and 1b are coated with a thin layer 40 of copper which exhibits good adhesion to glass and on which is deposited a layer 50 of tin-solder.

The intercalary sectional strip 2 has a lead base and is preferably tinned at least at 60 on the external portions of the flanges 2a, 2b. Said intercalary strip 2 is folded at the four corners, lead being very suitable for this operation by reason of its malleability. The sectional strip 2 thus forms a frame, the oppositely facing extremities of which are joined together at 2c by means of tin-solder (as shown in FIG. 1). The edges of the flanges of the sectional strip which is soldered to the panes 1a and 1b are provided with fillets formed of tin-solder as shown at 2d and 2e in FIG. 2.

In accordance with one mode of execution which is particularly advantageous for the purpose which is contemplated in the present invention, the glass pane 1a or 1b which is employed has a thickness of 4 mm and the oppositely facing edges of said panes are metallized with a layer 40 of copper having a width of 8 mm and a layer 50 of tin having a width of 6 mm and a thickness of 12/100 mm.

The method which is contemplated in this invention will first be described with particular reference to a simplified construction in which the invention can be carried into effect for soldering a flange to the glass pane. There will then be described an improved embodiment of the method for simultaneous soldering of two flanges. Finally, there will be described an industrial form of construction of a soldering table in accordance with the improved embodiment referred-to above.

In a simplified embodiment of the method as shown in FIG. 3 in which the lower flange 2a of the intercalary strip 2 (designated hereinafter as the spacer member) is soldered to the edge of one of the glass panes 1a, it is intended to carry out the following operations by means of a device whose essential components will be described with reference to the figure.

The glass pane 1a (4 mm in thickness) is placed on a horizontal table 20 so that the left-hand edge of said pane should be placed in overhung position on said table. Said left-hand edge is metallized with copper (over a width of 8 mm) and with tin (width 6 mm, thickness 12/100 mm). The spacer member 2 has a lead base and the lower flange 2a of this latter is applied against said table edge, the underface of said lower flange 2a having been previously tinned.

A moving soldering system is associated with the table 20 and is adapted to press the top face of the flange 2a against the edge of the pane 1a and along the entire length of said edge.

Said moving system essentially comprises a horizontal supporting beam 3 which is carried by a system of deformable parallelograms having arms 26 and 27 which are pivoted about horizontal axes X—X (only one parallelogram is shown in the figure) in order to permit of vertical displacement along the line F—F. A spring 28 which is attached to the arm 26 makes it possible to balance the beam 3 in a neutral position as well as the structures which are carried by said beam.

Said structures form a soldering jaw and are as follows:

a metallic heating block 5 is welded to the beam 3 and provided with a lip 101 which forms a soldering bit or peen and the flat underface of which is intended to be applied against the top face of the flange 2a. The lip 101 is provided with a vertical shoulder 100 which serves as an abutment or stop for the vertical end-face of the edge of the glass pane 1a;

a plate clamp 6 on which is fixed a parallelepipedal elastic block 9, the horizontal top face of which is intended to come into contact with the underface of the edge of the pane 1a. The plate clamp 6 is capable of sliding vertically with respect to the assembly consisting of the supporting beam 3 and heating block 5 by virtue of guide slots 102. The plate clam 6 is returned to the bottom position by means of springs 103, only one of which is shown in the drawings, and can be moved to the top position by virtue of eccentric cams 8 (only one cam being illustrated) which are rotatably mounted on pins carried by the beam 3. Control means (not shown) serve to produce the pivotal motion of the cams 8 in order to displace the plate clamp 6 between a bottom position and a top position.

The means for heating the block 3 in the embodiment hereinabove described are as follows (FIG. 3a): a duct 104 is formed longitudinally within the block 5 in order to provide a circulation of fluid which serves as a heat-transporting medium (for example a liquid) which heats the block 5 and in particular the lip 101 of this latter by thermal conductivity. In addition, a cooling fluid which is supplied through a pipe 105 can be distributed to ducts 106 which are formed within the interior of the heating block 5 and terminate in orifices 107 which are uniformly spaced along a chamfered edge 108 of the extremity of the lip 101.

By means of the device which has been described in the foregoing, the method is carried out as follows. After the glass pane 1 has been placed on the table 20 by hand, for example, the spacer member 2 is positioned so that the bottom flange thereof bears on the metallized edge of the pane 1. Insertion of the spacer member is made possible by reason of the fact that the cams 8 are in the bottom position and the lip 101 of the heating block 5 and the elastic block 9 which are carried by the plate clamp 6 are maintained in the separated position by virtue of the springs 103.

The heating block 5 is brought to a precisely determined temperature (such as 250° C) by virtue of the circulation of heating fluid which is admitted into the duct 104.

In order to perform the soldering operation, the cams 8 are first moved to their top position, thereby causing the vertical lifting motion of the plate clamp 6 relative to the heating block 5. The parts to be soldered or sealed are then clamped against the lip 101 and the elastic member 9. The clamping action obtained by means of the cams 8 is so adjusted that, in respect of predetermined thicknesses on the one hand of the glass pane 1a provided with its metallic coating and on the other hand of the flange 2a of the spacer member 2, a predetermined pressure is developed between these two elements (for example between 1.6 and 2.4 kgs/cm$^2$).

By reason of the fact that the beam 3 is self-balanced, the components 101 and 6 are both positioned at the correct height at the time of the clamping operation and solely under action of this operation.

The controlled application of heat which is produced by the lip 101 of the heating block 5 results in melting of the solder while controlled pressure is maintained at the same time. The fillets 2d, 2e are also formed while uniform melting of the layer of tin takes place.

As the device remains in the clamping position which has just been described, cold compressed air is blown through the ducts 105 and 106. This air is discharged in jets through the orifices 107 in the vicinity of the spacer member 2 at a short distance from the flange 2a. The resultant cooling of the flange 2a has the effect of setting the solder and a temperature drop of 10° to 20° then takes place.

While blowing of cooling air is continued, the cams 8 are moved to the bottom position in an operation which is reverse to that described above. The lip 101 of the heating block 5 and the elastic block 9 are separated under the action of the springs 103. The pane 1a to which the spacer member 2 is soldered can then be withdrawn and blowing of cooling air is stopped.

A high-quality soldered joint is thus obtained simultaneously along the entire length of one edge of the pane. The bond which is formed between the spacer member and the edge of the glass pane is leak-tight and has high strength (20 kg/cm of joint if a flange 5 mm in width is employed); the flange of the spacer member which undergoes expansion during the soldering operation is not deformed by reason of the clamping action to which it is subjected during this operation and by reason of the plasticity of lead.

Cooling by blowing of compressed air has the effect of lowering the temperature of the lip 101 and ensures rapid setting of the solder on the flange of the spacer member, thereby preventing any detachment at the moment of withdrawal of the plate clamp 6. The heating blocks 5 perform the function of heat-storage devices and permit a rapid temperature rise of the lips 101 as soon as the blowing has stopped.

In a preferred embodiment of the invention, a flux is interposed prior to soldering between the tinned flange of the spacer member and the metallized edge of the glass pane in order to assist the soldering process.

Moreover, it is understood that the solder can be applied in any desired manner between the flange 2a of the sectional strip 2 and the pane 1a provided that the solder adheres directly or through the intermediary of undercoatings to at least one of the parts to be soldered, said undercoatings in turn being intended to adhere respectively to the spacer member 2 and/or to the pane 1a.

One industrial form of construction of the soldering-jaw device, the essential components of which have been referred-to in the foregoing, is described with reference to FIGS. 11 and 12.

In these figures, there is shown the beam 3 together with the heating block 5 and the eccentric cam 8 which controls the displacement of the clamp 6. Said clamp is constituted by a curved plate adapted to carry a backing plate 151 which is secured by means of screws 152 and tightly grips the parallelepipedal block 9, said block being constituted by a flexible strip which extends along the entire length of the table 20.

Two guide plates 50 are secured to the clamp 6 by means of screws 153 which are fixed at intervals and a rod 54 is slidably mounted between the two guide plates, said rod carrying a roller 53 which is intended to cooperate with the cam 8. The height of the rod 54 can be adjusted by means of a wedge 55 which can be displaced in a direction parallel to its own axis by means of two opposed micrometer screws 155a, 155b.

The guide plates 50 are also rigidly fixed to a frame 156 which is retained by means of bolts 157 and projects beyond the beam 3.

In this example, the restoring spring 103 of FIG. 3 are housed within cylinders 158 which are attached to the beam 3. Said springs are applied against the frame 156 and tend to move this latter away from the beam 3, thus maintaining the roller 53 applied against the cam 8.

In practice, the clamps 6 and ancillary components are guided in translational motion by means of spaced rollers 159 which are mounted on the beam 3 and against which are applied shoes 161 of the frame 156 (as shown in FIG. 12).

This embodiment permits of accurate guiding and positioning of the clamp 6 over any desired distance.

The means described in the foregoing make it possible to solder the flange of the sectional strip to the glass pane all along one edge. By providing the lip 101 with a suitable shape and especially a right-angled arrangement, one example of which will be given hereinafter, the flange can be soldered simultaneously along two consecutive sides of the pane 1a.

There will now be described one advantageous embodiment of the method and the related device for carrying out simultaneous soldering of two flanges 2a, 2b of the sectional strip or spacer member to the panes 1a, 1b respectively. This operation can in any case be performed along two adjacent edges of the insulating double-pane unit to be manufactured.

In order to carry out simultaneous soldering of the flanges 2a, 2b which are located along one edge, a device of the type shown in FIG. 4 is preferably employed. This device comprises two associated soldering jaws, the displacements of which are independent of each other but can be coordinated.

More precisely, said device comprises a lower jaw which is similar to that of FIG. 3 and an upper jaw which is placed symmetrically with respect to a horizontal plane, the members of the lower jaw being followed in FIG 4 by the index $a$ and the members of the upper jaw being given the index $b$.

The lower jaw 5a, 9a and the upper jaw 5b, 9b are vertically displaceable independently of each other by virtue of systems of articulated parallelograms 26a, 27a and 26b, 27b. The arm 26b which is associated with a balancing spring 28b is disposed in such a manner as to counterbalance the weight of the upper jaw and thus produces action in the same direction as the arm 26a. The two jaws are thus in neutral equilibrium. The movements of the two jaws are limited with respect to each other by means of positionally adjustable stationary stops (not shown) which produce action on the upper articulated arms 26a and 26b of the lower and upper jaws. As shown in FIG. 5, said stops have the effect of maintaining the lips 101a and 101b of the heating block 5a and 5b at a minimum spacing $e$ which is pre-established as a function of the distance $d$ of the opposite faces of the flanges 2a, 2b of the spacer member 2. Moreover, said stops are so arranged that the mean level $h$ of the cross-hatched zone having a thickness $e$ within which the movement of closure of the jaws is prevented can be adjusted as a function of the thickness $E$ of the lower glass pane 1a.

In order to maintain a constant distance $d$ between the flanges 2a, 2b of the sectional strip 2 during the soldering operation with a view to preventing deformation of the web of said strip under the action of the heat supplied during the soldering operation, and taking into account the weight of the glass pane 1b, the relative spacing of the lips 101a, 101b is maintained at the value assumed by these latter after the panes 1a and 1b have been clamped respectively between the lip 101a and the elastic block 9a and between the lip 101b and the elastic block 9b. Said spacing is maintained by means of a packing-piece having a thickness which is preselected as a function of the height $d$ of the sectional strip. Said packing-piece is put into service during the soldering operation and placed between the arms 26a and 26b, then withdrawn on completion of this operation so as to permit the necessary closure of the lips 101a and 101b in order to permit insertion of the following insulation pane unit to be soldered. However, it is not possible by means of this movement of closure to bring said lips to a distance smaller than $e$ as has already been explained.

The operation of the method is as follows:

When the adjustments of the stops and of the packing-piece have been carried out as a function of the thickness $E$ of the glass panes and of the internal height $d$ of the sectional strip 2, the lips 101a and 101b being moved together to a minimum distance $e$, the superposed panes 1a and 1b which are separated by the sectional strip 2 are inserted so that the left-hand edge of the glass pane comes into abutment with the lower heating block 5a, the heating blocks 5a and 5b having been brought to the soldering temperature; clamping of the edges of the panes and of the flanges of the sectional strip is then carried out while the packing-piece is placed in position at the same time. After melting of the solder, this latter is cooled by blowing the cooling fluid through the ducts 105, 106 in the direction of flow indicated at J in FIG. 6. After the solder has set, the clamping forces are released while withdrawing the packing-piece.

The lips 101a and 101b move towards each other and the operation can be started again without any special adjustments of the stops and packing-piece when the insulating pane unit to be sealed has the same characteristics of thickness of glass and height of sectional strip.

In order to solder two adjacent edges of the insulating pane unit simultaneously, use is made of two devices of the type hereinabove described, said two devices being placed at right angles to each other.

A single control means actuates the cams 8 simultaneously as well as the packing-pieces which serve to maintain the spacing of the flanges of the sectional strip during the soldering operation.

The means for heating the heating blocks as well as for blowing cooling fluid can be actuated either separately or not in the case of each soldering assembly.

Adjustment of the spacing stops and the thickness of the packing-piece for spacing the sectional strip flanges are carried out separately in the case of each of the associated devices.

FIGS. 6 to 8 show one example of industrial construction of a soldering table comprising two heating jaw units disposed in an L-shaped arrangement so as to carry out soldering of the two flanges 2a, 2b along two consecutive edges of the pane unit.

In these figures in which the same elements as those shown in FIGS. 3 and 4 are designated by the same reference numerals, it is apparent that the table comprises a frame 51 on which are disposed pairs of articulation supports 52 for the arms 26a, 27a and 26b, 27b. The lower beams 3a are thus two in number and placed at right angles to each other. The same applies to the upper beams 3b. Similarly, provision is made for two heating blocks 5a and two further heating blocks 5b placed at right angles. The lips 101a of the blocks 5a meet each other with a slightly rounded edge corresponding to the edge provided for the pane unit and the same applies to the lips 101b of the blocks 5b.

In order to permit the up-and-down motion of the clamps 6, provision is made along the beams 3 for a set of cams 8 comprising, for example, three lift sectors and three cylindrical sectors each corresponding to a predetermined thickness of pane so as to permit the elastic block 9 to exert an equal soldering pressure in all cases.

The remainder of the control system which has been represented diagrammatically is similar to the system described with reference to FIGS. 11 and 12.

The cams 8 are actuated in synchronism both on the beams 3a and on the beams 3b by means of a centralized control device comprising a jack 57 which actuates an articulated shaft 61A through a toothed rack 58A and a pinion 59A. The toothed rack 58A meshes with an intermediate pinion 62 and this latter is disposed in mesh with another toothed rack 58B which drives a pinion 59B, said pinion being similar to the pinion 59A and in turn coupled with an articulated shaft 61B.

The shaft 61A produces the movement of rotation of the cams 8a, 8b of the beams 3a, 3b which are located on the same side of the soldering table whereas the shaft 61B produces the movement of rotation of the cams 8a, 8b which are located on the other side.

Each articulated shaft 61A, 61B actuates by means of sliding cardan-type couplings 63a, 63b (as shown in FIG. 9) bevel-gear drive units 64a, 64b which are coupled by means of sleeves 65a, 65b to a gear-train 66a, 66b in which the last pinion 67a, 67b is in mesh with toothed racks 68a, 69a and 68b, 69b respectively which are housed within the beams 3a, 3b and mesh with pinions 71a, 71b which are keyed of the shafts of the cams 8.

It is apparent that the driven motion of the toothed racks 58A, 58B under the action of the jack 57 causes the rotation of the shafts 61A, 61B in the same direction, thereby driving the pinions 66a, 66b in synchronism and causing the rotation of all the cams 8 through equal angles and simultaneously in the four beams 3a, 3b, with the result that the displacements of the clamps 6 with respect to the lips 101 are wholly synchronous and have the same amplitude.

The soldering table further comprises a bearing device having adjustable stops with a system for maintaining the spacing of the jaws. As shown in FIG. 10, this device is provided on each side of the soldering table with two stop supports 72 placed on each side of the set of articulated arms which serve to support the beams 3a, 3b.

Each stop support 72 is adapted to carry a sliding member 73, the vertical position of which is controlled by a cam 74 by means of a roller 75. The cam 74 has three rises and is driven by a transmission shaft 76 which serves to control the entire set of similar cams of the device. Rotation of the shaft 76 is controlled by a vernier 77 and can be secured in position by a locking means 80.

There are mounted on the sliding member 73 two shoes 78a, 78b which carry stop-rollers 79a, 79b respectively assigned to the upper arms 26a and 27b of the lower and upper jaws. Position-setting of the shoes 78a, 78b is carried out by means of wedges 81a, 81b, the position of which can be adjusted by means of transverse screws 82a, 82b.

The stop-rollers 79a and 79b limit respectively the upward and downward motion of the arms 26a and 27b and consequently permit compliance with the pre-established minimum spacing $e$ between the lips 101a, 101b. The cam 74 which produces action on the sliding member 73 serves to adjust the mean level $h$ of FIG. 5.

The arm 27b is applied against the stop-roller 79b by means of a cam 83 having three different rises, the choice between said rises being a function of the distance $d$ between the flanges 2a, 2b. This adjustment is controlled by a shaft 84 which is provided with a vernier 85, there being mounted on said shaft a notched locking disc 86 in which a push-rod 87 can be engaged.

The means for ensuring constant spacing of the lips 101a, 101b during the soldering operation further comprise:

on the upper arm 26a of the lower jaw a shaft 89 which is actuated by a jack 91 by means of a lever 92. The jack 91 is pivotally mounted at 93 on a support which forms part of the arm 26a. The shaft 89 carries a setting cam 94;

on the shaft 84 of the upper arm 27b of the upper jaw, a three-rise cam 95 located vertically above the cam 94;

a slide-block 96 mounted transversely on the arm 26b and adapted to carry two bearing rollers 97, 98.

The connecting rods 99 transmit the respective movements of the shafts 76, 84 and 89 to their corresponding shafts.

The slide-block 96 together with its rollers 97, 98 in fact serves as a distance-piece - packing block between the cams 94 and 95 in order to ensure that the spacing $d$ of the lips 101a, 101b is maintained during the soldering operation. The cam 95 thus makes it possible to provide a packing-piece of variable height according to the setting which is chosen.

The jack 91 is actuated as soon as the lower and upper jaws have closed and maintains these latter at a constant distance from each other by means of the cam 94.

The utilization of the soldering table as thus arranged entails the following operations:

manual indication of the thickness of the glass by means of the vernier 77 by rotation of the lower shaft 76 and securing in position by means of the locking system 80;

manual indication of the height of the spacer member 2 by means of the vernier 85 by rotation of the shaft 84 and securing in position by means of the locking system 87;

transfer of the assembly which consists of the glass pane 1a and the spot-soldered spacer member 2 and above which is mounted the pane 1b on the welding table, said assembly being transferred to the vicinity of the jaws and placed in position by hand;

synchronized closure of the clamps 6 as a result of action of the control jack 57 until the glass panes 1a, 1b are clamped in position by the elastic blocks 9;

position-setting for maintaining the spacing of the cams 94 under the action of the jack 91 on completion of the preceding stage;

soldering time control;

time control of compressed blowing air for setting the weld, the soldering time control being maintained.

end of time control:

opening of the clamps 6 by returning the control jack to the "neutral" position;

placing the cams 94 in the "neutral" position by return of the jacks 91;

stopping of air-blowing;
the product is withdrawn manually by the operator.

The device as thus designed and arranged permits of uniform soldering operations with a high degree of efficiency.

In an alternative construction of the soldering table, provision is made for a movable stop 201 which is added to the toothed rack 58 and with which are associated retractable forked stops 202a, 202b, etc.., these latter being controlled by jacks 203a, 203b, etc... The selective actuation of the jacks 203a, 203b is controlled by a rotary switch of the contact-stud type (not shown in the figure) which is driven by the shaft 76. As a consequence, the amplitude of the clamping action initiated by the cams 8 can be controlled automatically as a function of the thickness of the glass plates employed. This makes it possible to adapt the soldering table very rapidly to different productions.

It is readily apparent that the invention is not limited to the embodiments hereinabove described and that alternative forms of execution may accordingly be contemplated within the broad purview of the appended claims. It follows that the heating blocks 5 could comprise heating means other than ducts for the circulation of a heat-transfer medium and could comprise electric resistance means, for example.

What we claim is:

1. In a device for soldering a flange of a sectional lead strip to the edge of a glass pane which has been previously metallized with tin, especially for the manufacture of an insulating double-pane unit in which the two glass panes are separated by an intercalary U-section strip, comprising a stationary table for bearing the glass pane, a jaw system comprising a lower clamp and an upper jaw mounted for clamping the glass pane together with the adjacent flange of the sectional strip; and means for heating a lip-forming part of the upper jaw; the improvement comprising a movable beam to which the clamp and the upper jaw are secured, means for vertically moving the beam, and means for adjusting the position of the clamp with respect to the beam.

2. A device according to claim 1, said means for vertically moving the beam comprising at least two parallel arms which are each articulated to the beam and about a stationary horizontal axis, the two arms being movable with respect to a substantially horizontal average position, and a spring having one end secured to a point stationary with respect to the table and the other end secured to one of the two arms, the spring maintaining the beam in substantially neutral equilibrium.

3. A device according to claim 1, the clamp comprising an elastic block adapted to be applied on the glass pane, the clamp being movable transversely with respect to the upper jaw.

4. A device according to claim 3, the clamp being slidably mounted along the beam, and rotary cams which are carried by the beam and which support the clamp for adjustment of the spacing between the clamp and the upper jaw.

5. A device according to claim 1 for simultaneous soldering of two flanges of a single intercalary sectional strip, and two superposed movable jaw systems each having an upper jaw and a lower clamp, said two jaw systems being mounted for vertical motion relative to the device.

6. A device according to claim 5, and at least one stop to maintain the jaws at a minimum spacing as a function of the height of the intercalary sectional strip.

7. A device according to claim 5, and at least one distance-piece for maintaining a predetermined and constant relative spacing between the jaws during the soldering operation.

8. A device according to claim 5, and means for adjusting the mean height of the two jaws in the rest position relative to the table.

9. A device according to claim 5, there being two said jaw systems each comprising two jaws and two associated clamps which are superposed and placed symmetrically with respect to a horizontal plane, said two systems being disposed in an L-shaped arrangement.

10. A device according to claim 9, and centralized means for controlling the clamping of each said jaw system.

11. A device according to claim 5, and at least two parallel arms which are each articulated for each said jaw system.

12. A device according to claim 11, the stationary table having stop supports having an adjustable relative spacing, said stop supports supporting the upper arms of the two jaw systems.

13. A device according to claim 7, the distance piece comprising a movable cross-member which is mounted on the lower arm of the upper jaw system, said cross-member being mounted between a staged cam and a retractable spacing cam which applies the different components against each other in the active position.

14. A device according to claim 1, and a stop system automatically actuated by jacks as a function of the thickness of the glass pane.

* * * * *